(12) United States Patent
Rajchel et al.

(10) Patent No.: US 6,411,370 B1
(45) Date of Patent: Jun. 25, 2002

(54) OPTICAL SYSTEM AND METHOD FOR MEASURING DISTANCE

(75) Inventors: Suzanne K. Rajchel, Wheaton; Michael G. Ressl, Western Springs, both of IL (US)

(73) Assignee: Vantageport, Inc., Western Springs, IL (US)

( * ) Notice: Subject to any disclaimer, the term of this patent is extended or adjusted under 35 U.S.C. 154(b) by 0 days.

(21) Appl. No.: 09/447,786

(22) Filed: Nov. 23, 1999

Related U.S. Application Data

(60) Provisional application No. 60/109,464, filed on Nov. 23, 1998.

(51) Int. Cl.$^7$ .................................................. G01C 3/00
(52) U.S. Cl. ............................................................ 356/3
(58) Field of Search ........................... 356/3, 364, 373, 356/375, 376, 381, 4.01, 349, 357, 358, 5.09

(56) References Cited

U.S. PATENT DOCUMENTS

| 4,199,226 A | * | 4/1980 | Weber et al. ................ 350/157 |
| 4,973,153 A | * | 11/1990 | Yokokura et al. ............. 356/4.5 |
| 5,267,016 A | * | 11/1993 | Meinzer et al. .............. 356/358 |
| 5,793,784 A | * | 8/1998 | Wagshul et al. ............... 372/32 |
| 6,100,965 A | * | 8/2000 | Nerin ......................... 356/5.09 |
| 6,181,430 B1 | * | 1/2001 | Meyer et al. ................ 356/495 |

* cited by examiner

*Primary Examiner*—Frank G. Font
*Assistant Examiner*—Michael P. Stafira
(74) *Attorney, Agent, or Firm*—Cardinal Law Group

(57) ABSTRACT

An optical system for measuring distance and for range-finding is provided. This single beam system uses a polarization selector and a retardation plate to take advantage of the polarization properties of light from a transmit source and of light reflected to a receiver. Another embodiment of the system uses the properties of certain types of transmit sources to further reduce the dimensions of the system. Methods for using the system are also provided.

20 Claims, 4 Drawing Sheets

OPTICAL SYSTEM AND METHOD FOR MEASURING DISTANCE

RELATED APPLICATION

This application claims the benefit of U.S. Provisional Patent Application Ser. No. 60/109,464, entitled "Improved Distance Measurement System For Rangefinder," filed Nov. 23, 1998, the entire specification of which is incorporated herein by reference.

FIELD OF THE INVENTION

This invention relates to optical systems for use in distance measurement or range-finding devices. More particularly, this invention relates to single beam optical systems in range-finding and measurement devices.

BACKGROUND OF THE INVENTION

Dual beam range-finders are commonly used to determine distances. In current applications of range-finders, the size, weight and cost of the range-finding system may typically be ignored. Conventional range-finding systems are used to determine distances for agriculture, aviation and nautical applications.

Although these dual beam systems are adequate for current uses, simultaneous reductions in all four dimensions of size, weight, complexity and cost could enhance distance measuring or range-finding systems for broader or mass market uses. Furthermore, existing dual beam systems also exhibit dead zones, which it would be desirable to eliminate.

As shown in FIG. 4, a typical dual beam range-finding system 300 includes one beam path 318 for a transmit system 310 (comprising one transmit source 312 transmitting one beam 314 through one lens 316) and another beam path 328 for a receiving system 320 (comprising a reflected beam 324 passing through a second lens 326 and being received by a receiver 322).

In the dual beam system 300 of FIG. 4, the transmit source 312 of transmit system 310 emits light that travels through the lens 316. This light becomes the collimated outbound beam 314. The outbound beam 314 hits a target (an object in space such as, for example, a building, a bar code on the building or an identification unit mounted on the building). The outbound beam is reflected from the target and returns to the receiving system 320 of the dual beam system 300 via beam path 328. As this reflected beam 324 passes through lens 326, it is refracted so that it comes to a focus at receiver 322. The angle between the outbound beam path 318 and return beam path 328 may be zero or some small angle. The area A within the angle formed between the beam paths 318 and 328 is considered a dead zone, in which no target can reflect a return beam 324 that will be caught and returned by lens 326 to receiver 322.

The techniques of optical beam combination have been used in other optical systems—such as microscopes that incorporate laser based micro-machining systems. However, the application of these techniques to distance measuring or range-finding systems for the purposes of reducing the overall system size, weight, complexity and cost would be desirable.

Multiple technologies may also be integrated into a given range-finding or distance measurement system. Such integration of multiple technologies into one range-finding system would also make it desirable to render each component of the range-finding system, particularly the optical system, as compact as possible.

DETAILED DESCRIPTION OF THE PRESENTLY PREFERRED EMBODIMENTS

Figure 1:
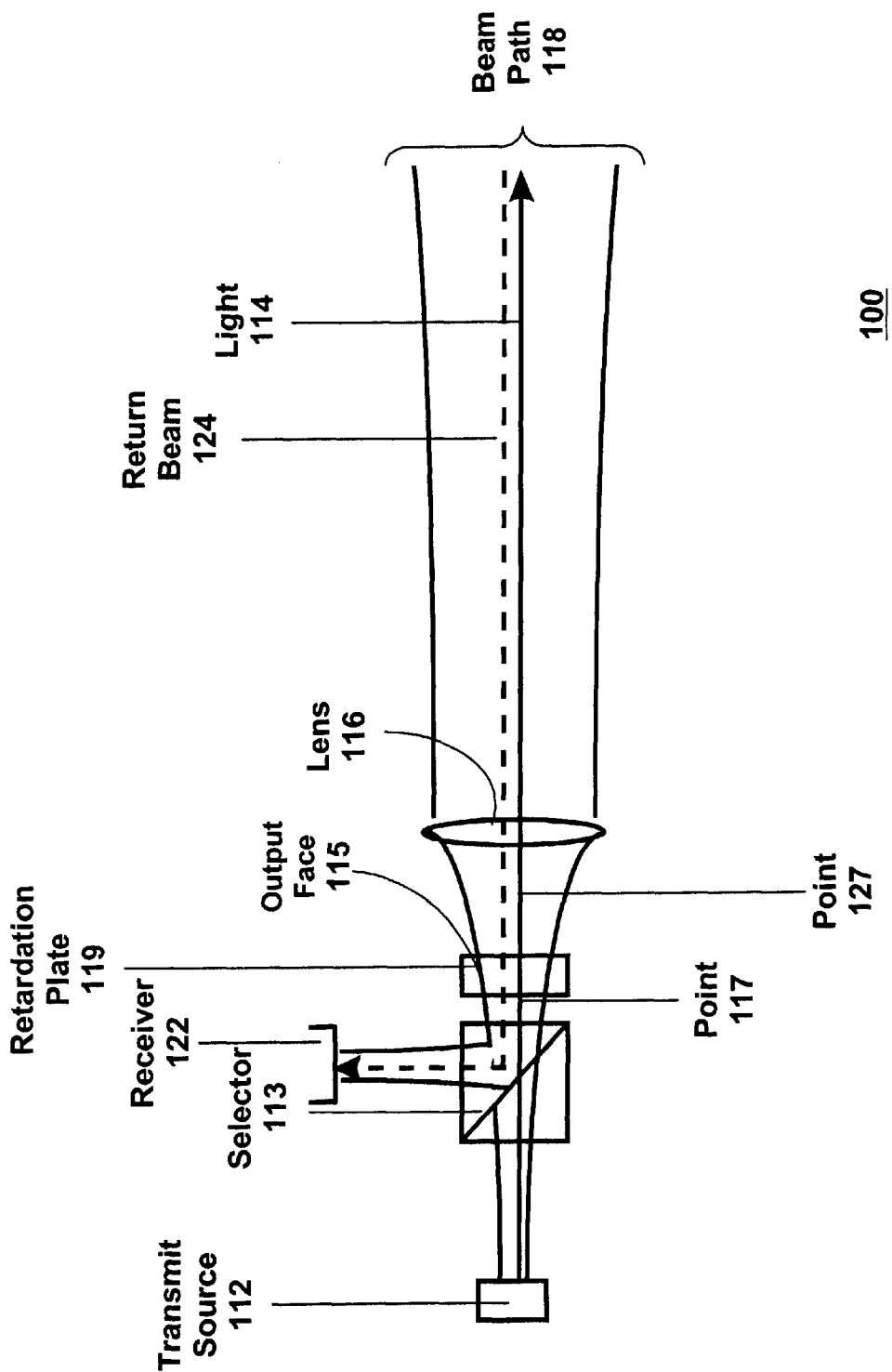
FIG. 1 is a schematic view of one embodiment of an optical system of the present invention.

Referring now to FIG. 1, one embodiment of an optical system 100 for a range-finder is shown. Optical system 100 preferably relies on the polarization properties of the typical light sources used in conventional optics-based distance measurement and range-finder devices.

In system 100, transmit source 112 emits a linearly polarized outbound beam 114 of light. Transmit source 112 may be any source which emits light, such as, for example, a laser diode. It is also typical, though not required, that the emitted polarization type of the light 114 be fixed with respect to time, as is the orientation of the polarization. Alternatively, transmit source 112 may emit non-polarized or non-linearly polarized light 114, but this will increase loss of light 114, 124 from the system.

"Light" may include but is not limited to: non-polarized light; polarized light of elliptical, circular, linear or other orientation; radiation from sources emitting electromagnetic radiation in other than visible portions of the electromagnetic spectrum or any source of electromagnetic radiation that can emit polarized radiation. Polarized light may be defined as light in which the motion of the wave of light is confined to one plane or one direction.

Figure 2:
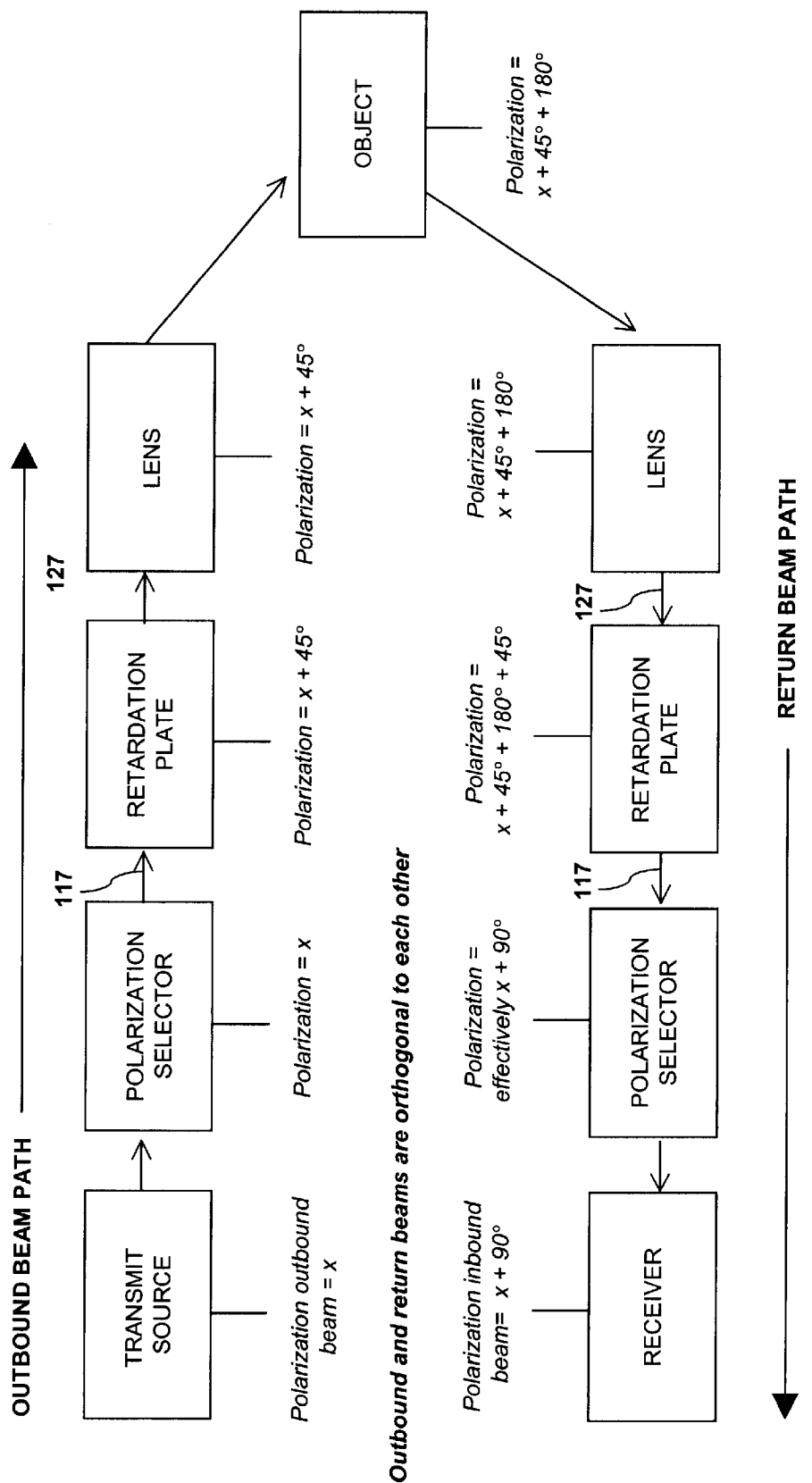
FIG. 2 is a time line of the change of the polarization state of light traveling through the embodiment of FIG. 1.

Outbound light 114 then passes through polarization selector optic 113. This optic 113 is constructed and positioned so as to minimize loss and aberration of the transmitted beam 114. Polarization selector optic 113 may be any optic that is capable of differentiating between several polarizations of light. Polarization selector optic 113 may thus be an optic capable of selecting at least one particular polarization; it may further allow light of other polarizations to pass through it unaltered in polarization state. For example, in the embodiment of FIG. 1, the polarized light 114 of transmit source 112 passes unaltered through the polarization selectoroptic 113. Depending on the transmit source 112 and the polarization selector optic 113 used, the selector I 13 can also serve the purpose of creating a linearly polarized beam at its output face 115. In these cases for example, transmit source 112 would emit non-polarized light 114 which, upon passing through selector 113, would become polarized. In either case, at point 117 of beam path 118, light 114 is preferably linearly polarized, for example, vertically polarized with a polarization state of x degrees (where x is any degree from 0 to 360) as shown in FIG. 2.

In the embodiment of FIG. 1, light 114 next encounters the retardation plate optic 119. This optic 119 is constructed and aligned to produce minimum reflections at its surface and to minimize transmission losses to the transmitted beam 114. Retardation plate optic 119 could be any optic which is capable of rotating light (e.g. beam 114), or more particularly, the polarization of light in a desired direction. In order to accomplish this, plate 119 is typically designed of crystalline material that has different indices of refraction along two separate crystal axes. Plate 119 is preferably constructed and positioned so as to produce wave front phase retardation on the transmitted beam 114. In the embodiment of FIG. 1, this wave front phase retardation is ¼ wave (45 degrees) from the original polarization state of beam 114. Thus, as seen in FIGS. 1 and 2, outbound beam 114 at point 127 now has a polarization state of x+45 degrees. Plate 119 may also be designed to minimize temperature effects.

The transmitted beam 114 next passes through lens 116 along outbound beam path 118. The outbound beam 114 hits a target (an object in space such as, for example, a building, a bar code on the building or an identification unit mounted on the building). The outbound beam 114 is reflected from the target and returns to the system 100 via the same beam path 118. The transmitted light 114 is now return beam 124 which is heading for the receiver 122, but, as shown in FIG. 1, does not follow a different path back to a different lens as in system 300 of FIG. 4. Thus, incorporation of polarization selector optic 113 and retardation plate 119 allows the two beam paths 318, 328 of FIG. 4 to be reduced to one beam path 118 that is used for both transmit and receive.

Light 114 is now reflected light 124. Typically, reflection from the target would produce 180 degree phase retardation in the return beam 124. Thus, as shown in FIG. 2, the beam 114 (now beam 124) has a polarization state of x+45 degrees+180 degrees. The function of polarization optic 113 of the embodiment of FIG. 1 is preferably not affected by this phase retardation, i.e. it will treat a polarization state of x m in the same way as a polarization state of x+180 degrees since they lie in the same plane.

Return beam 124 now passes through lens 116. Next return beam 124 passes through the retardation plate 119 which introduces another wave front phase retardation on the return beam 124. This second wave front phase retardation adds to that already present on the return beam 124 which occurred during outbound beam's 114 pass through the retardation plate 119. In the embodiment of FIGS. 1 and 2, the second wave front phase retardation on the return beam 124 is also ¼ wave (45 degrees).

Thus the polarization state of return beam 124 at point 117 is now x+45 degrees+180 degrees+45 degrees. Because the embodiment of FIGS. 1 and 2 discount the 180 degrees for reasons described above, the return beam's 124 polarization state is effectively x+90 degrees at point 117 and is thus orthogonal to beam 114 originally transmitted from the transmit source 112 via the polarization selector 113.

The return beam 124 now encounters the polarization selector 113. Since the polarization state of the return beam 124 is now different (in the embodiment of FIGS. 1 and 2, orthogonal) to that originally transmitted by the polarization selector 113 in the form of the outbound beam 114, the return beam 124 is directed by polarization selector towards the receiver 122. Receiver 122 is any suitable substrate for receiving light, including for example, a silicon photo diode.

In FIG. 1, the receiver 122 is oriented at 90 degrees to the return beam axis and transmit source 112. However, receiver 122 is not required to be positioned in this orientation. Selection of a different type of polarization selector 113 would determine the position of the receiver 122 in relation to source 112.

Figure 3:
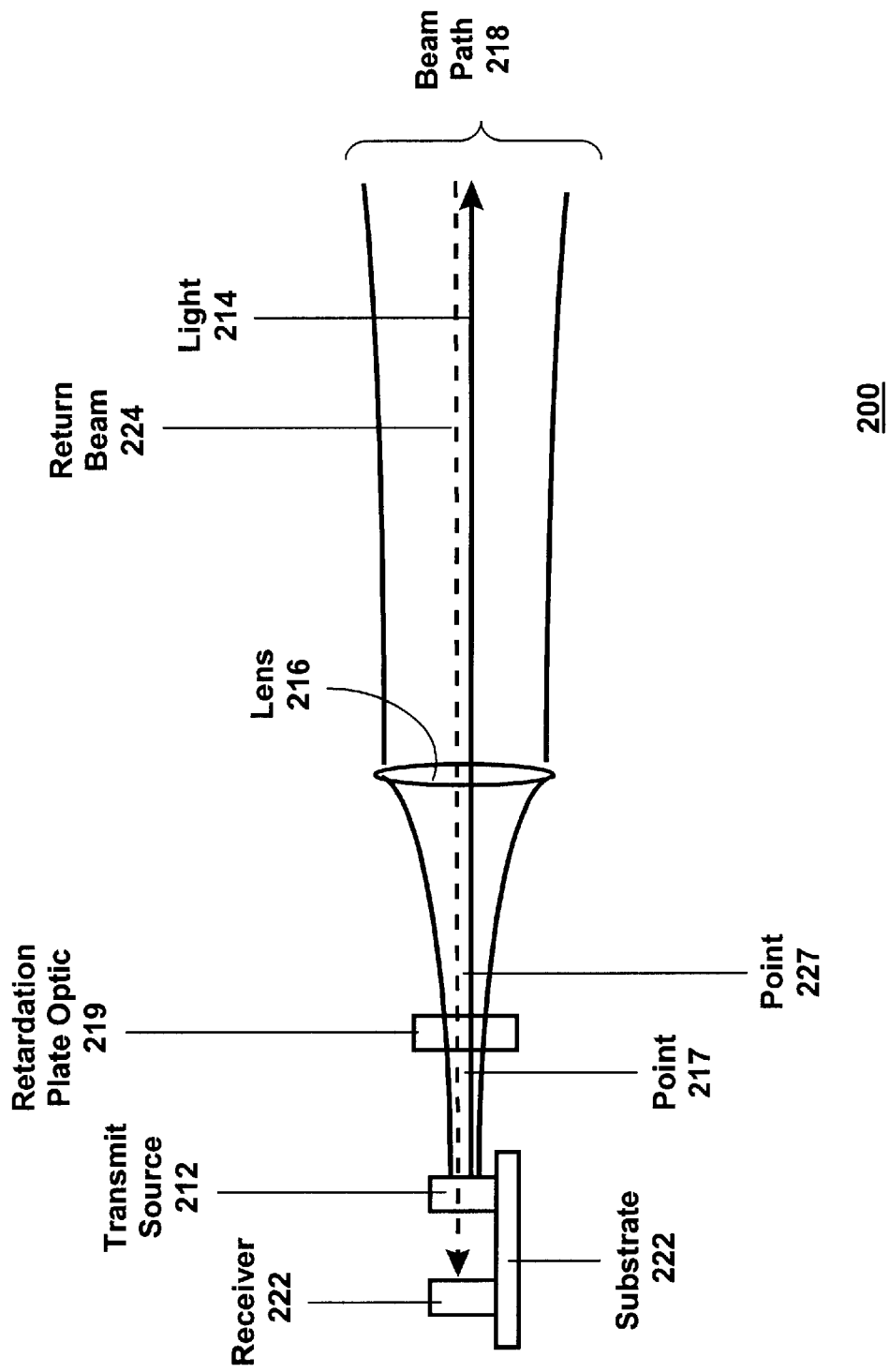
FIG. 3 is a schematic view of a second embodiment of an optical system of the present invention.

As shown in FIG. 3, selection of a different transmit source 212 can also determine the position of receiver 222 in relation to source 212. For example, FIG. 3 shows receiver 222 positioned in line with beams 214, 224.

Certain types of transmit sources 212 are substantially transparent to the return beam 224 wavelength. Thus it is possible to position receiver 222 behind transmit source 212. It may be desirable to mount both transmit source 212 and receiver 222 on the same substrate 230 which is any suitable substrate for growing a transmit source 212. Mounting the transmitter and receiver on the same substrate 230 may allow for simultaneous thermal control of both.

In a sense, the transmit source 212 of FIG. 3 performs the function of polarization selector 113 in the embodiment of FIG. 1. Thus, the embodiment of FIG. 3 further reduces the size, weight and cost of the system 200 by alleviating the need to incorporate a separate polarization selector optic. Optical system 200 preferably relies on the polarization properties of the typical light sources used in conventional optics-based distance measurement and range-finder devices.

Referring now to FIG. 3, transmit source 212 emits polarized light 214 so that at point 217 of beam path 218, light 214 is preferably linearly polarized, for example, vertically polarized with a polarization state of x degrees (where x is any degree from 0 to 360).

Light 214 next encounters the retardation plate optic 219, which imparts a wave front retardation phase retardation as describe above. In the embodiment of FIG. 3, this wave front phase retardation is ¼ wave (45 degrees) from the original polarization state of beam 214. Outbound beam 214 at point 227 now has a polarization state of x+45 degrees.

The transmitted beam 214 next passes through lens 216 along outbound beam path 218. The outbound beam 214 hits a target, is reflected from the target and returns to the system 200 via the same beam path 218. Incorporation of a transmit source 212 which is effectively transparent to beam 224 and of retardation plate 219 allows the two beam paths 318, and 328 of FIG. 4 to be reduced to one beam path 218 that is used for both transmit and receive.

Light 214 is now reflected light 224 and may, as described above, now have a polarization state of x+45 degrees+180 degrees. The function and/or performance of transmit source 212 of the embodiment of FIG. 3 is preferably not affected by the phase retardation caused by reflection from the target. In this embodiment, transmit source 212 treats a polarization state of x in the same way as a polarization state of x+180 degrees.

Return beam 224 now passes through lens 216. Next return beam 224 passes through the retardation plate 219 which introduces another wave front phase retardation on the return beam 224. This second wave front phase retardation adds to that already present on the return beam 224 which occurred during outbound beam's 214 pass through the retardation plate 219. In the embodiment of FIG. 3, the second wave front phase retardation on the return beam 224 is also ¼ wave (45 degrees).

Thus the polarization state of return beam 224 at point 217 is now x+45 degrees+180 degrees+45 degrees. As described above, the return beam's 224 polarization state is effectively x+90 degrees at point 217 and is thus orthogonal to beam 214 which was originally transmitted from the transmit source 212. This serves to substantially reduce interference effects between the two beams (the outgoing transmit 214 and incoming return 224 beams). Return beam 224 is thus able to pass very near, or substantially through transmit source 212 on its way to receiver 222.

Figure 4:
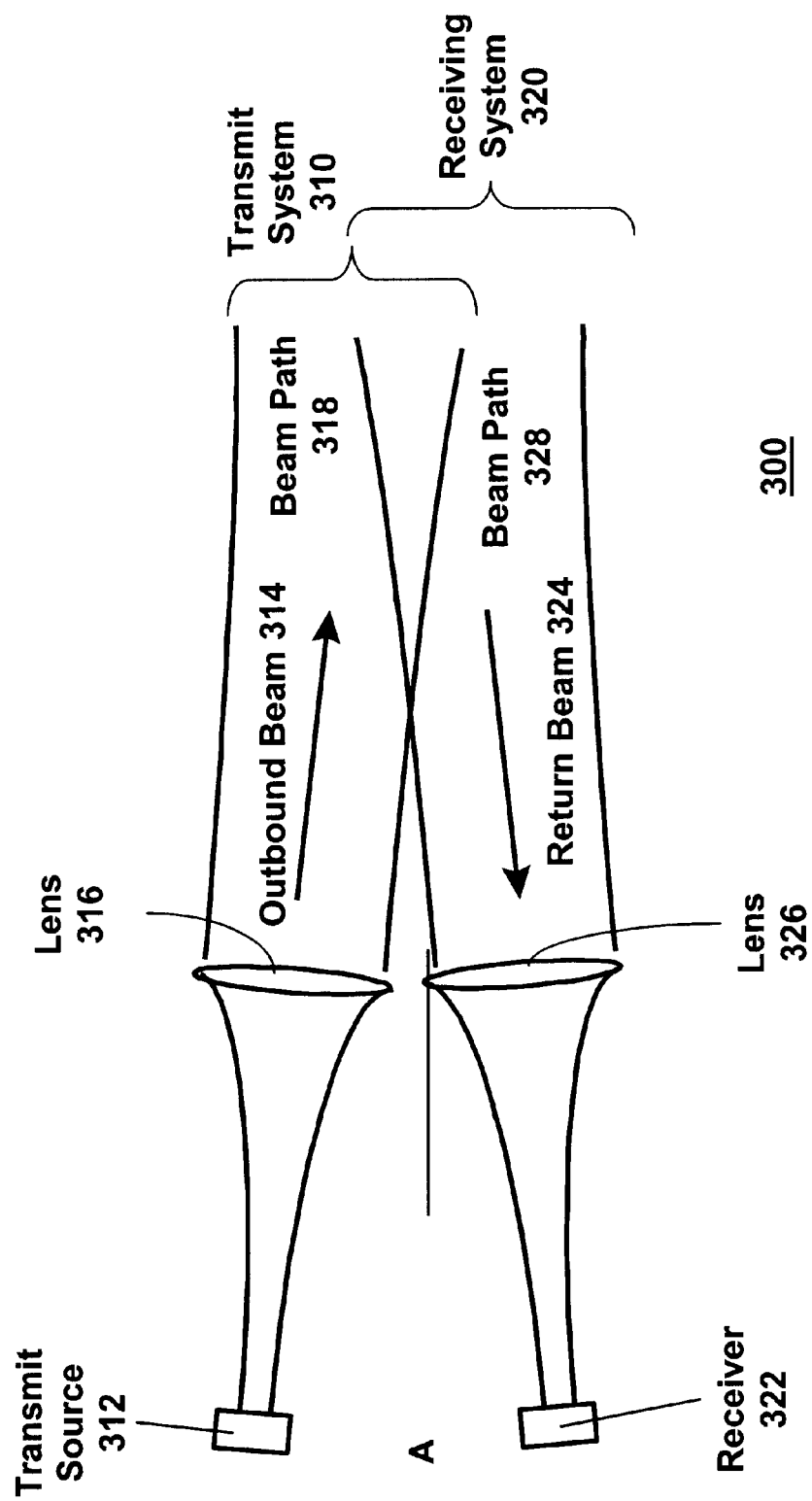
FIG. 4 is a schematic view of one embodiment of a prior art dual beam optical system for a range-finder.

It can be seen from FIGS. 1, 3 and 4 that systems 100 and 200 eliminate area A and thus any dead zone equivalent to the dead zone formed by beam paths 318, 328 in system 300.

As seen by comparing FIGS. 1 and 3 to FIG. 4, the designs of optical system 100 and 200 also reduce the complexity and cost of presently available optics-based distance measuring systems, while simultaneously improving the manufacturability and decreasing the size and weight of such sub-systems without sacrificing the system performance. System 100 utilizes the polarization properties of the light 114, 124 to collapse what are typically two optical systems 310, 320 into one optical system 100. System 200 further uses the polarization properties of the light 214, 224 and the properties of certain types of transmit sources 212 to collapse optical system 310, 320 into an even more streamlined optical system 200. Optical systems 100, 200 incorporate polarization selection and rotation optics to provide substantially reduced optical systems for, range-finders.

Optical systems 100, 200 allow simultaneous reductions in all four dimensions of size, weight, complexity and cost and therefore make range-finding systems incorporating systems 100, 200 more attractive for broader, or mass market uses. Optical systems 100, 200 can also be used in conjunction with technologies of range-finding and compass readings for determining relative position and, with the absolute positioning of GPS, in order to determine the location of remote structures.

Furthermore, the systems of the present invention offer the possibility of significantly reducing range finding system manufacturing costs by lowering parts numbers and the requisite fixtures for those eliminated parts. Such low cost, reduced size, reduced complexity, minimum weight systems could conceivably be used by police, fire, ambulance, or any other type of emergency service, overnight delivery services, postal service, utility services, pizza delivery, meter-reading, golf courses, railroads, military vehicles, as well as private use.

Other potential applications include, but are not limited to: enhanced or mobile 911; enhanced directory services; air-traffic control; automobile and transportation; automated mass transit; public and private telecommunications systems; construction; geophysical and geologic industries; entertainment; medical; sports; manufacturing; mapping; meteorological applications; forestry management; agricultural industry; mining industry; aviation and nautical industries; HVAC systems; enhanced earth-moving systems; warehouse inventory management; ESDA haz-mat registry; tourism; mobile Internet access; and integration of this system with other systems.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

We claim:

1. An optical system for distance measurement, comprising:
   a transmit source operably aligned with a retardation plate;
   the retardation plate operably aligned with a lens to allow an outbound beam of light transmitted from the transmit source to pass through the retardation plate and through the lens;
   a receiver operably aligned with the retardation plate and positioned to receive a return beam of light reflected from an object, said return beam passing through the retardation plate in a second instance before reaching the receiver; and
   a selector operably aligned with the receiver to differentiate between the outbound and return beams, wherein the transmit source, the retardation plate, the receiver and the selector are operably aligned in a same plane.

2. The system of claim 1 wherein the selector is a polarization selector operatively adapted to differentiate between at least two beams of light based on polarization of the light.

3. The system of claim 1 wherein the selector is substantially transparent to-a wavelength of the return beam of light.

4. The system of claim 1 wherein the selector and the transmit source are the same device.

5. The system of claim 1 wherein the selector is positioned to minimize loss and aberration of the outbound beam and the return beam.

6. The system of claim 1 wherein the selector is positioned to allow the outbound beam to pass through the selector before passing through the retardation plate.

7. The system of claim 1 wherein the retardation plate is positioned to produce minimum reflections at its surface and to minimize transmission losses to the outbound beam and the return beam.

8. The system of claim 1 wherein the receiver is a substrate operably adapted to receive light.

9. The system of claim 1 wherein the receiver is selected from the group consisting of: semiconductor photo diodes, photo cells, biological optical systems, radio receive systems, photo tubes and microwave receivers.

10. The system of claim 1 wherein the retardation plate is a device operably adapted to rotate at least one polarization of light.

11. The system of claim 1 wherein the retardation plate is a material that has a plurality of indices of refraction along at least two separate axes.

12. The system of claim 1 wherein the transmit source is a substrate operatively adapted to emit light.

13. The system of claim 1 wherein the transmit source is selected from the group consisting of: laser sources, incandescent sources, fluorescent sources, microwave sources, semiconductor sources, maser sources and plasma sources.

14. The system of claim 1 wherein the return beam is reflected from the object.

15. The system of claim 1 wherein light is selected from the group consisting of: non-polarized light, elliptically oriented polarized light, circularly oriented polarized light, linearly oriented polarized light, polarized light, electromagnetic radiation from the visible portion of the electromagnetic spectrum and electromagnetic radiation from the non-visible portion of the electromagnetic spectrum.

16. The system of claim 1 wherein the transmit source, the retardation plate, the receiver and the selector are operably positioned within a range-finder housing.

17. The system of claim 1 wherein the transmit source, the retardation plate, the lens, the receiver and the selector are operably positioned in the same plane.

18. A method of transmitting light in a distance-measurement system comprising the steps of:
   providing a transmit source substantially transparent to an inbound beam on a substrate;
   providing a receiver on the same substrate;
   transmitting an outbound beam of light, having a first polarization, from the transmit source to a retardation plate, the retardation plate operably aligned in a same plane with the transmit source;
   rotating polarization of the outbound beam with the retardation plate;
   further transmitting the outbound beam through a lens to an object;
   reflecting the outbound beam from the object back to the lens;
   passing the reflected beam from the lens to the retardation plate;
   rotating polarization of the reflected beam in a second instance so that the reflected beam has a second polarization; and
   sending the selected beam to the receiver through the transmit source.

19. An apparatus for measuring distance comprising:

a range-finder housing;

a transmit source for transmitting light operably attached to the housing;

a retardation plate for rotating polarization of light operably attached to the housing;

a lens operably aligned with the retardation plate to allow an outbound beam of light transmitted from the transmit source to pass through the retardation plate and the lens;

a receiver operably positioned within the housing to receive a return beam of light reflected from an object, said return beam passing through the retardation plate in a second instance before reaching the receiver; and a selector operably aligned with the receiver to differentiate between the outbound and return beams wherein the transmit source, the retardation plate, the receiver and the selector are operably aligned in a same plane within the housing.

20. The apparatus of claim 19 wherein the transmit source, the retardation plate, the lens, the receiver and the selector are operably positioned in the same plane within the housing.

* * * * *